United States Patent
Liang et al.

(10) Patent No.: US 9,470,830 B2
(45) Date of Patent: Oct. 18, 2016

(54) LIGHT-GUIDING COVER AND ILLUMINATION DEVICE HAVING THE SAME

(71) Applicants: LITE-ON ELECTRONICS (GUANGZHOU) LIMITED, Guangzhou (CN); LITE-ON TECHNOLOGY CORPORATION, Taipei (TW)

(72) Inventors: Chun-Wei Liang, New Taipei (TW); Wei-Chung Cheng, New Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 306 days.

(21) Appl. No.: 14/242,507

(22) Filed: Apr. 1, 2014

(65) Prior Publication Data

US 2014/0211481 A1    Jul. 31, 2014

Related U.S. Application Data

(63) Continuation-in-part of application No. 13/339,228, filed on Dec. 28, 2011, now Pat. No. 8,764,260.

(30) Foreign Application Priority Data

Nov. 27, 2013    (CN) .................... 2013 2 0772256 U

(51) Int. Cl.
F21V 5/04    (2006.01)
F21V 5/00    (2015.01)

(Continued)

(52) U.S. Cl.
CPC ............... *G02B 6/0001* (2013.01); *F21K 9/13* (2013.01); *F21V 5/04* (2013.01); *F21V 7/0091* (2013.01);

(Continued)

(58) Field of Classification Search
CPC ........... G02B 6/0001; G02B 19/0061; G02B 19/0028; F21V 7/0091; F21V 7/043; F21V 5/04; F21V 5/046; F21V 13/02; F21V 13/04; F21V 29/504; F21V 29/506; F21W 2121/00; F21Y 2101/02
USPC ....................... 362/555, 569, 249.02, 311.02, 362/311.06–311.1, 311.13, 329, 310, 810
See application file for complete search history.

(56) References Cited

U.S. PATENT DOCUMENTS 6,218,785 B1 *    4/2001    Incerti .................... F21K 9/135
                                                                313/634
8,616,733 B1 *   12/2013    Millikan .................. F21V 5/04
                                                                362/249.02

(Continued)

*Primary Examiner* — Y M. Lee
*Assistant Examiner* — Erin Kryukova
(74) *Attorney, Agent, or Firm* — Li & Cai Intellectual Property (USA) Office

(57) ABSTRACT

A light-guiding cover includes a light input surface defining a central axis and a light output surface. The light-guiding cover has a reflecting portion formed therein and substantially symmetrical about the central axis. The reflecting portion surrounding the central axis has an outer reflecting surface and an inner reflecting surface. The light input surface is defined into two regions, an inner region and an outer region, by the reflecting portion. The outer reflecting surface of the reflecting portion is arranged away from the central axis, the inner reflecting surface of the reflecting portion is arranged near to the central axis. Thus, the light-guiding cover of the instant disclosure can guide the light beams emanated from a LED to travel in certain optical paths and provide uniformly distributed lighting. Moreover, the instant disclosure also provides an illumination device having the light-guiding cover that can omni-directionally illuminate.

21 Claims, 11 Drawing Sheets

(51) Int. Cl.
*F21V 3/00* (2015.01)
*F21V 7/04* (2006.01)
*H01L 33/00* (2010.01)
*F23D 3/16* (2006.01)
*F21V 8/00* (2006.01)
*F21V 29/00* (2015.01)
*F21K 99/00* (2016.01)
*F21V 7/00* (2006.01)
*G02B 19/00* (2006.01)
*F21V 29/70* (2015.01)
*F21W 121/00* (2006.01)
*F21Y 101/02* (2006.01)

(52) U.S. Cl.
CPC ............. *F21V 29/004* (2013.01); *F21V 29/70* (2015.01); *G02B 19/0028* (2013.01); *G02B 19/0061* (2013.01); *F21V 7/043* (2013.01); *F21W 2121/00* (2013.01); *F21Y 2101/02* (2013.01)

(56) References Cited

U.S. PATENT DOCUMENTS

| | | | |
|---|---|---|---|
| 2005/0201118 A1* | 9/2005 | Godo | F21V 5/04 362/555 |
| 2010/0109500 A1* | 5/2010 | Kao | G02B 19/0061 313/46 |
| 2012/0020082 A1* | 1/2012 | Shinohara | F21K 9/135 362/235 |
| 2013/0083555 A1* | 4/2013 | Chen | G02B 6/0003 362/555 |
| 2013/0114266 A1* | 5/2013 | Chuang | G02B 6/0006 362/296.01 |
| 2013/0308338 A1* | 11/2013 | Lin | F21K 9/135 362/609 |

* cited by examiner

LIGHT-GUIDING COVER AND ILLUMINATION DEVICE HAVING THE SAME

CROSS-REFERENCE TO RELATED APPLICATION

This application is a continuation-in-part application of U.S. application Ser. No. 13/339,228 filed on Dec. 28, 2011 and entitled "LIGHT-GUIDING COVER AND ILLUMINATION DEVICE HAVING THE SAME", now pending. The entirety of each of the above-mentioned patent applications is hereby incorporated by reference herein and made as a part of this specification.

BACKGROUND OF THE INVENTION

1. Field of the Invention

The instant disclosure relates to an illumination device; more particularly, to a light-guiding cover for housing at least one light-emitting diode (LED) and an illumination device having the same.

2. Description of Related Art

Conventional illumination devices include the use of tungsten lamps (incandescent light bulbs) and fluorescent lamps. These light sources emit light radially outward in an omni-directional manner. For different applications, the illumination devices often come with different light covers, where the light covers may vary in surface patterns and/or colors.

However, as the LEDs become more improved, the use of tungsten and fluorescent lamps is gradually diminishing. Nevertheless, the light emitted by an LED is directional. Namely, the light dispersion output from the LEDs are generally in the forward direction also offering only approximately no more than 180 degrees of coverage. The restricted illumination range is unlike the conventional tungsten or fluorescent lamps. The directional characteristic of the LEDs also tends to produce glare, which also limit the application range of the LEDs.

SUMMARY OF THE INVENTION

One object of the instant disclosure is to provide an illumination device. The illumination device includes a light-guiding cover integrally formed in one piece, wherein the light-guiding cover includes a light input surface and a light output surface, the light input surface defines a central axis perpendicular thereto, and each one of the light input surface and the light output surface is symmetrical about the central axis, the light-guiding cover has a reflecting portion inwardly formed from the light input surface and substantially symmetrical about the central axis, the reflecting portion surrounding the central axis has a first surface and a corresponding second surface, and wherein the light input surface is defined as an inner region and an outer region by the reflecting portion. The first surface of the reflecting portion facing the light output surface is arranged away from the central axis to act as an outer reflecting surface, the second surface of the reflecting portion facing the central axis is arranged near to the central axis to act as an inner reflecting surface; and an LED having a light emitting surface arranged in a top surface thereof, wherein the LED is arranged adjacent to the light input surface of the light-guiding cover, and the light emitting surface orientates toward the light input surface, and wherein the light emitting surface of the LED is sized to be substantially the same as the light input surface of the light-guiding cover; wherein the LED is configured to emanate light beams partially entering the light-guiding cover via the inner region of the light input surface and then reflected by the inner reflecting surface to exit from an upper light output region of the light output surface, the light beams are also partially entering the light-guiding cover via the outer region of the light input surface and then reflected by the outer reflecting surface to exit from the upper light output region and a lower light output region of the light output surface.

Another object of the instant disclosure is to provide a light-guiding cover. The light-guiding cover includes a light input surface and a light output surface, the light input surface defines a central axis perpendicular thereto, and each one of the light input surface and the light output surface is symmetrical about the central axis, the light-guiding cover having a reflecting portion is formed therein and substantially symmetrical about the central axis, wherein the reflecting portion surrounding the central axis has a first surface and a corresponding second surface, and wherein the light input surface is defined as an inner region and an outer region by the reflecting portion, the first surface of the reflecting portion facing the light output surface is arranged away from the central axis to act as an outer reflecting surface, the second surface of the reflecting portion facing the central axis is arranged near to the central axis to act as an inner reflecting surface.

Based on the above, the reflecting portion is formed in the light-guiding cover and inwardly formed from the light input surface and is provided with the inner reflecting surface and the outer reflecting surface, such that the light beams emanated from the LED are separated into two parts by the reflecting portion for enabling the two parts of the light beams to be respectively reflected by the inner reflecting surface and the outer reflecting surface, thereby guiding the two parts of the light beams to travel in certain optical paths and respectively pass through two predetermined areas of the light output surface.

In order to further appreciate the characteristics and technical contents of the present invention, references are hereunder made to the detailed descriptions and appended drawings in connection with the present invention. However, the appended drawings are merely shown for exemplary purposes, rather than being used to restrict the scope of the present invention.

DETAILED DESCRIPTION OF EMBODIMENTS

First Embodiment

Figure 1:
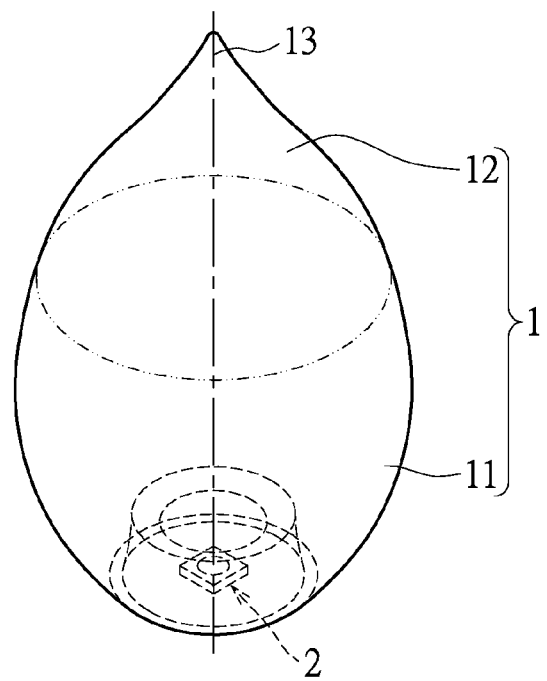
FIG. 1 is a perspective view of a light-guiding cover for a first embodiment of the instant disclosure.
Figure 2:
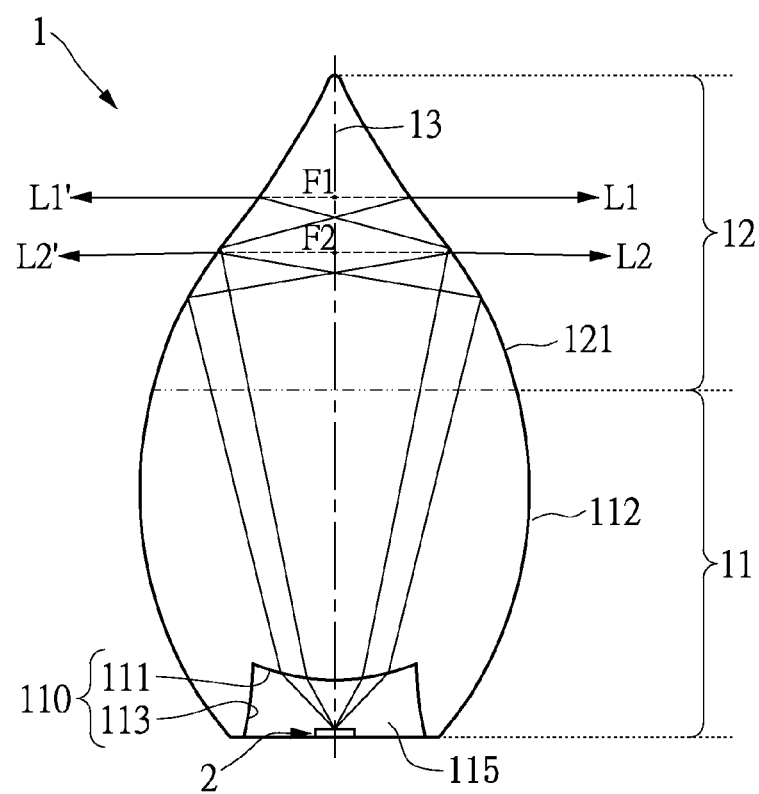
FIG. 2 shows the optical paths in the light-guiding cover in FIG. 1.
Figure 3:
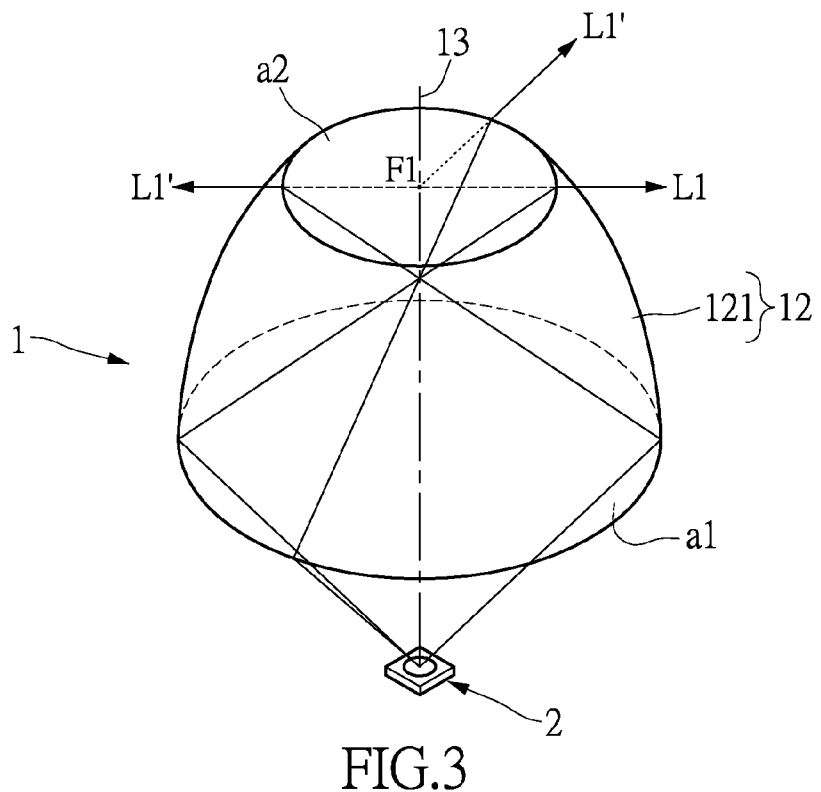
FIG. 3 is a partial perspective view of the light-guiding cover in FIG. 1 and optical paths travelled by the light beams.
Figure 4:
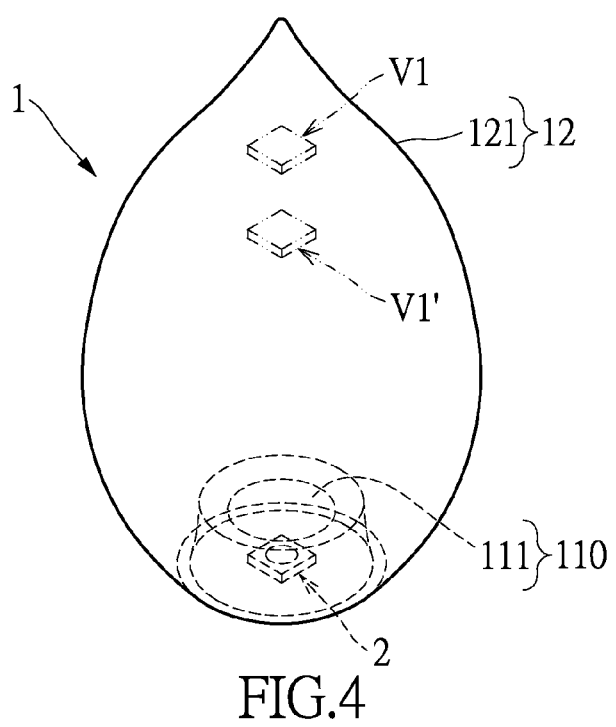
FIG. 4 shows virtual LEDs produced in the light-guiding cover in FIG. 1.
Figure 5:
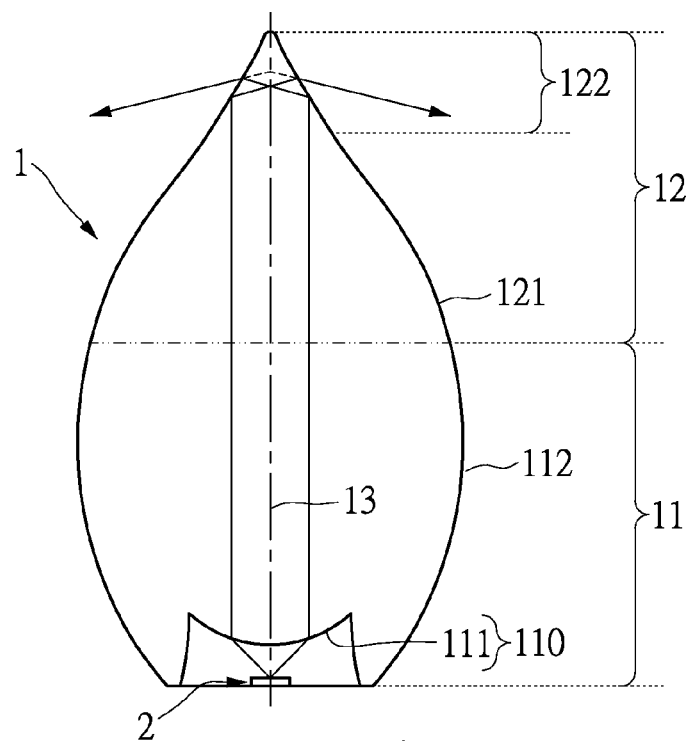
FIG. 5 shows virtual focal points produced in an upper end portion of a light output portion of the light-guiding cover in FIG. 1.
Figure 6:
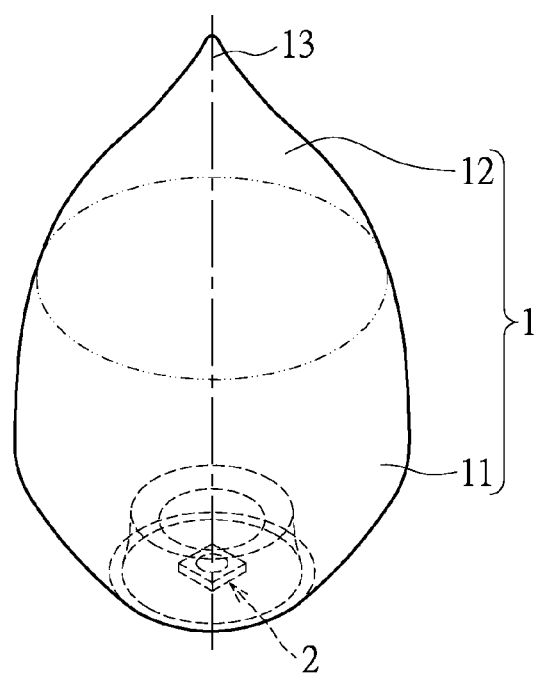
FIG. 6 is a perspective view of a light-guiding cover for a second embodiment of the instant disclosure.

Please refer to FIGS. 1 to 5, which show a light-guiding cover 1 for a first embodiment of the instant disclosure. Namely, FIGS. 1, 3, and 4 are the perspective views of the light-guiding cover 1. Whereas FIGS. 2, 3 and 5 show the light path in the light-guiding cover 1.

As shown in FIG. 1, the light-guiding cover 1 is used for guiding light emitted by an LED 2. For explanation purpose, a single LED 2 is used for the instant embodiment. However, in practice, the number of the LEDs 2 is not restricted, where an array of LEDs may be used.

The light-guiding cover 1 has a light-guiding portion 11 and a light output portion 12, where the light-guiding cover 1 is integrally formed in one piece. The light-guiding cover 1 has a central axis 13. The light-guiding portion 11 and the light output portion 12 are substantially symmetrical about the central axis 13. The LED 2 which, in the mounted condition shown in FIGS. 1-5, is on the central axis 13.

For the instant embodiment, the light-guiding cover 1 is symmetrical about the central axis 13. However, in practice, the light-guiding cover 1 may be only approximately symmetrical about the central axis 13 according to different requirements. For the instant embodiment, the light-guiding cover 1 is shaped like a candle flare or a chandelier bulb.

Moreover, the light-guiding cover 1 is a solid body made from glass, acrylic glass, polyethylene (PE), poly(methyl acrylate), or any suitable combinations.

Please refer to FIGS. 2-4. The light-guiding portion 11 has a light input surface 110. In this embodiment, the light input surface 110, comprising a central surface 111 and an annular surface 113, is configured to be concave in one end of the light-guiding portion 11 for receiving light beams emitted by the LED 2. The central surface 111, located at the bottom center of the light-guiding cover 1, is on the central axis 13. The annular surface 113 extends from the periphery of the central surface 111 toward the LED 2. The central surface 111 and the annular surface 113 cooperatively define an accommodating slot 115 for hosting the LED 2. The central surface 111 and the annular surface 113 are separated from the LED 2 and transmit the light beams coming from the central portion and the peripheral portion of the LED 2, respectively, to the light-guiding portion 11. The light-guiding portion 11 further has a connecting surface 112 connected to the annular surface 113 and surrounded the light input surface 110.

For the instant embodiment, the central surface 111 is a curved surface but not limited thereto. In practice, the central surface 111 may be a free-form surface, a multi-segmented surface, a leveled surface, a Fresnel-lens like surface, or any other suitable surface.

Likewise, the annular surface 113 of the instant embodiment is a curved surface but not limited thereto. In practice, the annular surface 113 may be a leveled surface, a parabolic surface, a free-form surface, a multi-segmented surface, or any other suitable surface.

The light output portion 12 is formed extendingly from another end of the light-guiding portion 11 opposite of the light input surface 110. The light output portion 12 has an optical surface 121. The optical surface 121 extends from one end of the connecting surface 112 away from the central surface 111. The optical surface 121 is substantially symmetrical about the central axis 13 and gradually tapers away from the light-guiding portion 11. In other words, the distance between the optical surface 121 and the central axis 13 gradually decreases in a direction away from the light-guiding portion 11. For the instant embodiment, the optical surface 121 allows the light to reflect or pass therethrough. Light reflections by the optical surface 121 are total internal reflections.

The optical surface 121 of the instant embodiment is a curved surface. In other words, the optical surface 121 may be a parabolic surface, a free-form surface, a multi-segmented surface, or any other surface with suitable shape. The cross-section of the light output portion 12 normal to the central axis 13 is substantially circular-shaped but is not limited thereto. In addition, the optical surface 121 may have a non-smooth texture. For example, the optical surface 121 may be hazed or have localized protrusions, convexities, or concavities to further diffuse the light uniformly. Thereby, the light output portion 12 of the light-guiding cover 1 may illuminate in a manner to better engender soothing and visually pleasing lighting effects.

Moreover, the optical paths provided by the light-guiding cover 1 allow the majority of the light beams that enter the light-guiding cover 1 to disperse from the light output portion 12. Accordingly, the light-guiding cover 1 may illuminate in an omni-directional manner as a tungsten lamp. The light-guiding cover 1 also reduces glare associated with the LEDs.

To further understand the optical paths inside the light-guiding cover 1, FIGS. 2 and 3 are illustrated with solid lines to represent the optical paths travelled by the light beams. However, the optical paths are not restricted thereto. As shown in FIG. 2, a light beam L1 coming from the LED 2 is refracted by the central surface 111 and enters the light-guiding portion 11. The light beam L1 received by the light-guiding portion 11 is guided by the central surface 111 for light reflection from one side to another side of the optical surface 121 across the central axis 13 to exit from the light-output portion 12.

More specifically, as shown in FIG. 3, when the light beam L1 is refracted to the optical surface 121 on one side of the central axis 13, the light beam L1 meets the optical surface 121 of the light output portion 12 at the periphery of a defined cross-sectional of the light-guiding cover 1. The light beam L1 is then reflected to another side of the optical surface 121 by passing through the central axis 13. The reflected light beam L1 meets the optical surface 121 at the periphery of a cross-section a2 defined on the light-guiding cover 1. The area of the cross-section a2 is less than the area of the cross-sectional.

Likewise, a light beam L1' emanating from the same light source as the light beam L1 also travels in a same manner to exit from the light output portion 12. Thus, a virtual focal point F1 is produced on the central axis 13 by the exiting light beams L1, L1'.

Under the same principle, light beams L2, L2' emanating from the LED 2 create a virtual focal point F2, as shown in FIG. 2, on the central axis 13. To the user, the light seems to originate from the virtual focal points F1, F2. In addition, other light beams (not shown) emanating from the LED 2 produce a plurality of virtual focal points on the central axis 13 after being refracted by the central surface 111, thus give rise to a virtual filament to provide the user a candle-like visual perception. However, the number and position of the virtual light sources may be varied according to the user and the operating environment.

The formation of the virtual focal points F1, F2 is further explained hereinbelow. When the light beams L1, L1', L2, and L2' emanate from the LED 2, the distance between the light beams L1, L1' and the central axis 13 is closer than the distance between the light beams L2, L2' and the central axis 13. The central surface 111 has a certain curvature such that as the light beams L1, L1', L2, and L2' pass therethrough, the angles subtended between the light beams L1, L1' and the central axis 13 are smaller than the angles subtended between the light beams L2, L2' and the central axis 13. Then, based on a certain curvature of the optical surface 121, the light beams L1, L1', L2, and L2' are reflected in producing the virtual focal points F1, F2. The distance between the virtual focal point F1 and the LED 2 is greater than the distance between the virtual focal point F2 and the LED 2.

Moreover, the light beams L1, L1' emanate from the same location of the LED 2. Light beams (not shown) emanate from other locations on the LED 2 may produce a plurality of virtual focal points in proximity to the virtual focal point F1. Thus, a virtual point-like LED V1 may be produced at the virtual focal point F1, as shown in FIG. 4.

Likewise, another virtual point-like LED V1' may be produced at the virtual focal point F2, as also seen in FIG. 4.

Thereby, when the light-guiding cover 1 is arranged over the LED 2, the cover 1 can illuminate in an omni-directional manner with the virtual LEDs V1, V1' being at the center thereof. In other words, the light-guiding cover 1 can illuminate in an omni-directional manner like conventional tungsten lamps.

Besides, the reflection of light beams by the optical surface 121 is total internal reflection. Thus, the light-guiding cover 1 is enabled to provide improved light-guiding and light-emitting effects, by dispersing the light more uniformly in the central and peripheral directions Also, by changing the respective curvatures of the central surface 111 and the optical surface 121, the locations of the virtual focal points (or virtual LEDs) can be varied on the central axis 13.

For example, as shown in FIG. 5, the curvature of the central surface 111 is being increased. As previously mentioned, virtual focal points are produced when the light beams are guided by the central surface 111 and the optical surface 121. However, with the increased curvature, the virtual focal points are produced further away from the LED 2 in comparison to the aforementioned virtual focal points F1, F2. Accordingly, the virtual LEDs are produced in an upper end portion 122 of light-guiding cover 1 opposite of the LED 2.

The term "upper end portion 122" is referred herein as the narrow portion of the optical surface 121 having a different curvature from the broader portion of the optical surface 121.

Two virtual LEDs V1, V1' are produced for the instant embodiment but is not limited thereto. In practice, the central surface 111 and the optical surface 121 may be designed to produce a single or multiple virtual LEDs in the light output portion 12 of the light-guiding cover 1.

Second Embodiment

Please refer to FIGS. 6-10, which show a light-guiding cover 1 for a second embodiment of the instant disclosure. In comparison to the previous embodiment, the light-guiding portion 11 of the instant embodiment has a reflecting surface 114. The reflecting surface 114 provides additional optical paths for light beams in the light-guiding cover 1.

Figure 7:
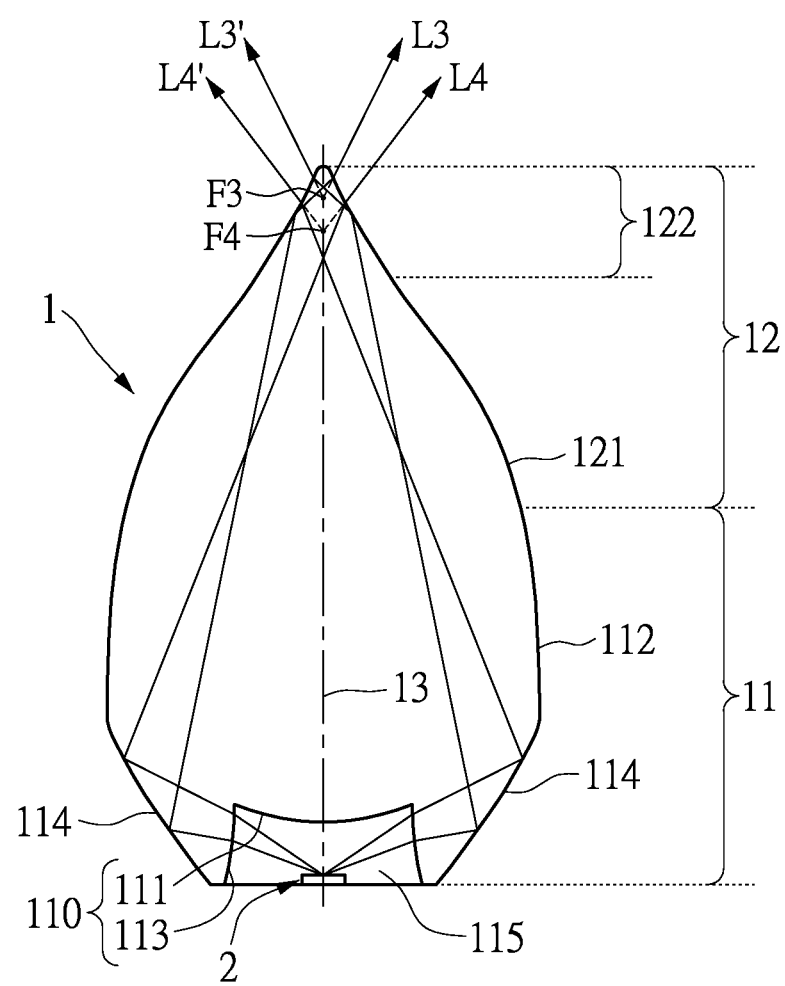
FIG. 7 shows the optical paths in the light-guiding cover in FIG. 6.

Please refer to FIG. 7. The light-guiding portion 11 has the connecting surface 112 and the reflecting surface 114. The connecting surface 112 gradually tapers in a direction away from the LED 2. In other words, the distance between the connecting surface 112 and the central axis 13 gradually decreases in a direction away from the LED 2.

The reflecting surface 114 is formed extendingly from the connecting surface 112 in a direction away from the optical surface 121. The distance between the reflecting surface 114 and the central axis 13 gradually decreases in a direction away from the connecting surface 112. Light reflection by the reflecting surface 114 is total internal reflection.

For the instant embodiment, the reflecting surface 114 is a curved surface but not restricted thereto. In practice, the reflecting surface 114 may be a leveled surface, a parabolic surface, a free-form surface, a multi-segmented surface, or any other surface with suitable shape.

To further explain the optical paths in the light-guiding cover 1, FIG. 7 is illustrated with solid lines to represent symmetrical optical paths travelled by the light beams. However, the optical paths are not restricted thereto.

As shown in FIG. 7, a light beam L3 emanating from the LED 2 is refracted by the annular surface 113 upon entering the light-guiding portion 11. The refracted light beam L3 is received by the reflecting surface 114, which reflects the light beam L3 to a generic point on the optical surface 121 on one side of the central axis 13. The reflected light beam L3 is redirected by the aforementioned optical surface 121 to another generic point on the optical surface 121 on the other side of the central axis 13, where the light beam L3 exits from the light output portion 12.

Likewise, a light beam L4 emanating from the LED 2 is refracted by the annular surface 113 upon entering the light-guiding portion 11. The refracted light beam L4 is received by the reflecting surface 114, which reflects the light beam L4 to a generic point on the optical surface 121 on one side of the central axis 13. The reflected light beam L4 is redirected by the aforementioned optical surface 121 to another generic point on the optical surface 121 on the other side of the central axis 13, where the light beam L4 exits from the light output portion 12.

As previously mentioned in the first embodiment, where the virtual focal point F1 is generated by the light beams L1, L1', virtual focal points F3, F4 are generated by the light beams L3, L3' and L4, L4' from the LED 2 on the central axis 13 at the upper end portion 122 of the light output portion 12, respectively. In addition to the light beams L3, L3', L4, L4', other light beams (not shown) emanating from the LED 2 would generate a plurality of virtual focal points on the central axis 13 in the upper end portion 122 of the light output portion 12, after being guided by the annular surface 113 and the reflecting surface 114. The virtual focal points produce the visual effect of a virtual filament. However, the number and position of the virtual focal point (virtual light source) may be varied according to the user or the operating environment.

The formation of the virtual focal points F3, F4 is further explained hereinbelow. The annular surface 113 has a certain curvature such that as the light beams L3, L3', L4, L4' pass therethrough, the angles subtended between the light beams L3, L3' and the central axis 13 are larger than the angles subtended between the light beams L4, L4' and the central axis 13. Thus, the distance between the virtual focal point F3 and the LED 2 is greater than the distance between the virtual focal point F4 and the LED 2.

Moreover, the light beams L3, L3' emanate from the same location of the LED 2. Light beams (not shown) emanate from other locations on the LED 2 may produce a plurality of virtual focal points in proximity to the virtual focal point F3. Thus, a virtual LED V2 may be produced at the virtual focal point F3, as illustrated in FIG. 8.

Figure 8:
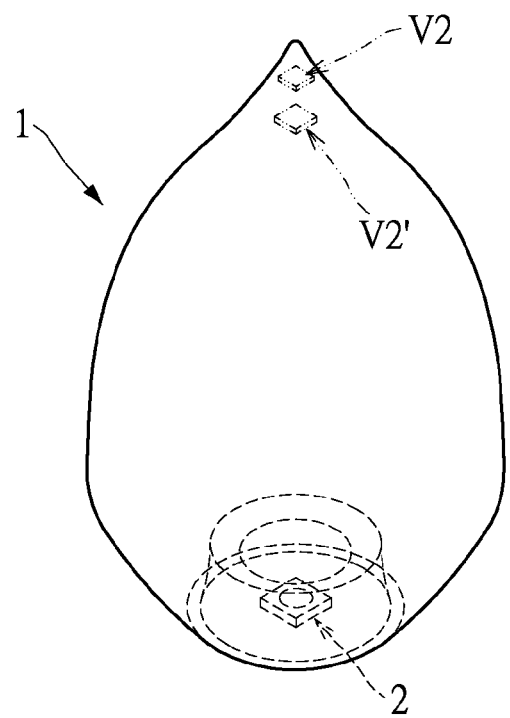
FIG. 8 shows the virtual LEDs produced by light beams passing through an annular surface of the light-guiding cover in FIG. 6.

Likewise, another virtual LED V2' (as shown in FIG. 8) is produced at the virtual focal point F4 in the light-guiding cover 1. Notably, the virtual LEDs V2, V2' may be very close to one another in the upper end portion 122 of the light output portion 12. The close proximity may results in overlapping virtual images, with the user being able to identify only a single virtual LED visually.

Thereby, when the light-guiding cover 1 is arranged over the LED 2, the upper end portion 122 of the light output portion 12 of the light-guiding cover 1 can illuminate in an omni-directional manner with the virtual LEDs V2, V2' being at the center thereof. In other words, the light-guiding cover 1 can emit light in an omni-directional manner like conventional tungsten lamps.

Figure 9:
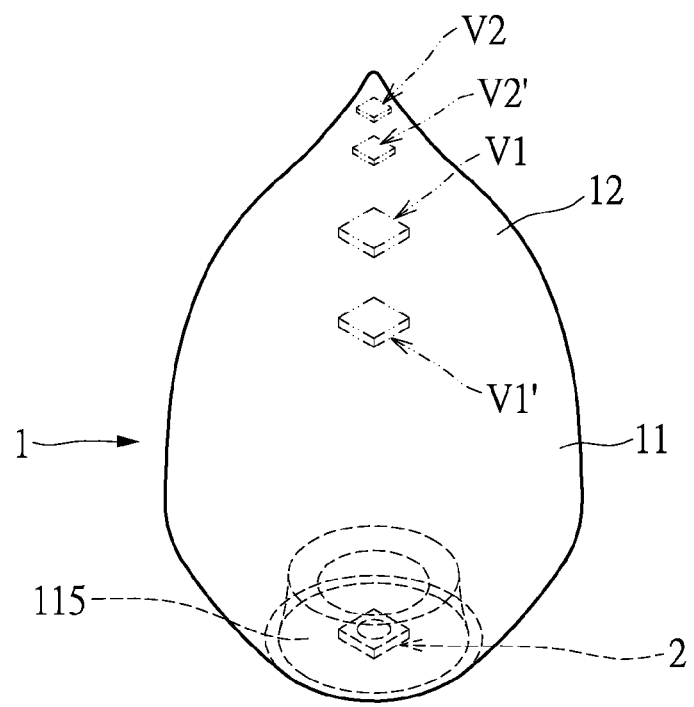
FIG. 9 shows the light-guiding cover in FIG. 6 at operating state.

Please note, FIG. 8 is used for describing the formation of the virtual LEDs V2, V2' only, rather than for illustrating the imaging effect of the light-guiding cover 1 in operating condition. When using the light-guiding cover 1 of the instant embodiment, four virtual LEDs V1, V1', V2, V2' are presented concurrently (as shown in FIG. 9), but is not restricted thereto.

Also, by changing the curvature of the annular surface 113, the locations of the virtual focal points can be varied on the central axis 13 in the upper end portion 122 of the light output portion 12.

Figure 10:
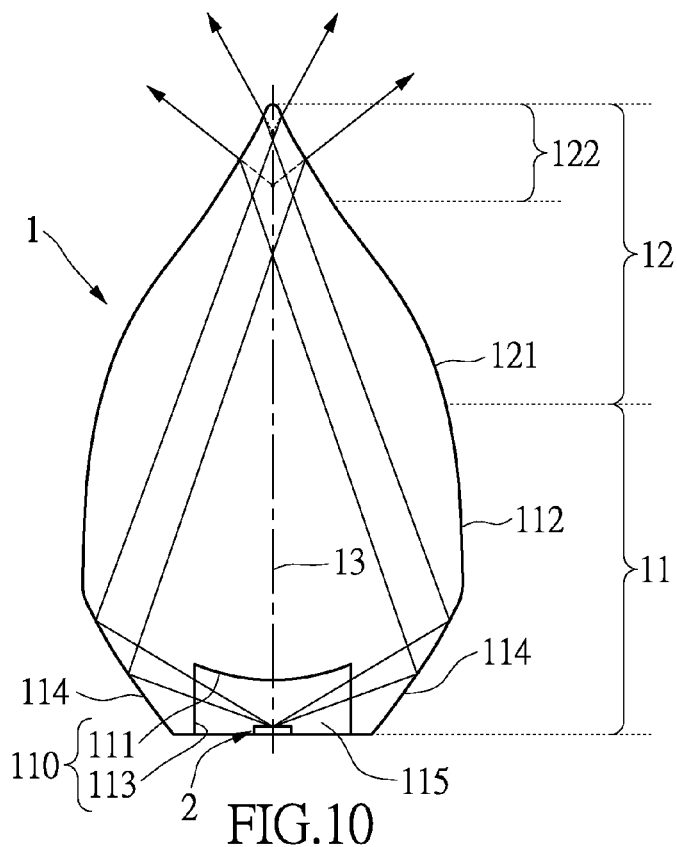
FIG. 10 shows the light-guiding cover in FIG. 6 having a leveled annular surface and optical paths travelled by the light beams.

Alternatively, the annular surface 113 may be a leveled surface, as shown in FIG. 10. When the light beams enter the light-guiding cover 1 through the annular surface 113, the optical paths travelled by the light beams are different in comparison to the optical paths taken by the aforementioned light beams L3, L3', L4, L4'. Correspondingly, virtual focal points are produced along the central axis 13 in the upper end portion 122 of the light output portion 12. The virtual LEDs (not show) are also produced accordingly in the upper end portion 122 of the light output portion 12. However, in comparison to the virtual focal points F3, F4, the virtual focal points produced by the leveled annular surface 113 are arranged at different positions along the central axis 13.

The redirection of light beams by the reflecting surface 114 is total internal reflection. Thus, the light-guiding cover 1 is capable of providing improved light-guiding and light-emitting effects, allowing the light to be dispersed more uniformly in the central and peripheral directions.

For the instant embodiment, the light-guiding cover 1 is shaped substantially like a candle flare or a chandelier bulb. Thus, the shape change of the light-guiding cover 1 may in turn add additional optical paths, while maintain the light-guiding cover 1 to be aesthetically appealing.

Third Embodiment

Figure 11:
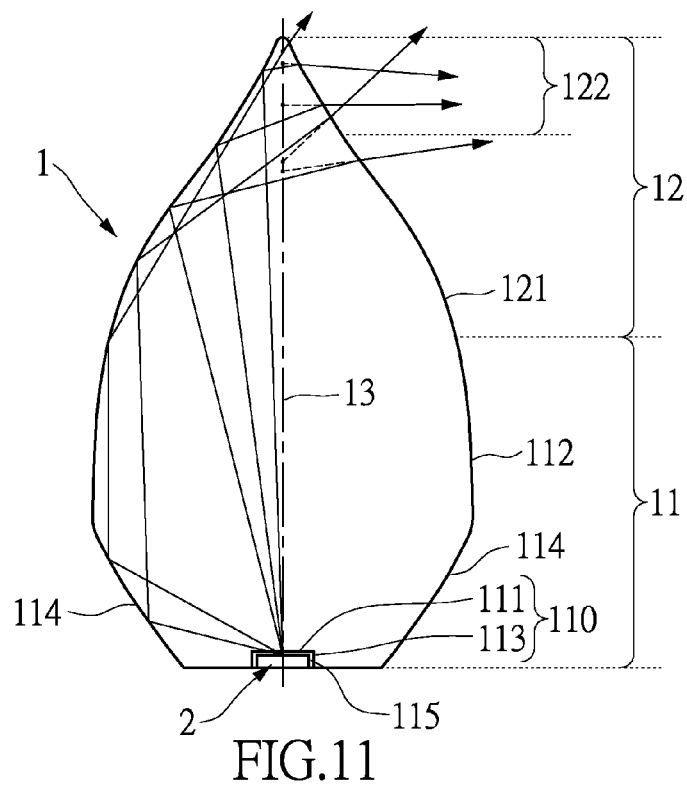
FIG. 11 shows the optical paths in a light-guiding cover for a third embodiment of the instant disclosure.

Please refer to FIG. 11, which shows a light-guiding cover 1 for a third embodiment of the instant disclosure. In comparing to the second embodiment, the main difference being: the accommodating slot 115 is sized substantially the same as the LED 2.

More specifically, the central surface 111 is substantially in contact with the light emitting surface of the LED 2 (i.e., the central surface 111 is physically touching the LED 2 or having a clearance formed therewith). The annular surface 113 is also substantially in contact with the side portions of the LED 2. Regarding the optical paths travelled by the light beams emanating from the LED 2, FIG. 11 is illustrated with solid lines to represent the optical paths. However, the optical paths are not restricted thereto.

The light beams emanating from the LED 2 enters the light guiding portion 11 through the central surface 111, where two types of optical paths are produced in the light guiding portion 11.

For the first type of optical path, a light beam is guided directly to a generic point on the optical surface 121 on one side of the central axis 13. The above-mentioned optical surface 121 redirects the light beam to another generic point on the optical surface 121 on the other side of the central axis 13, where the light beam exits from the light output portion 12.

For the second type of optical path, a light beam is guided directly to the reflecting surface 114. The reflecting surface 114 reflects the light beam to a generic point on the optical surface 121 on one side of the central axis 13. The reflected light beam is redirected by the aforementioned optical surface 121 to another generic point on the optical surface 121 on the other side of the central axis 13, where the light beam exits from the light output portion 12.

Moreover, the above-described optical paths allow a plurality of virtual focal points to be formed along the central axis 13 in the light output portion 12. Thus, a virtual filament can be produced visually. The positions of the virtual focal points may be adjusted by changing the curvatures of the optical surface 121 and/or the reflecting surface 114.

Figure 12:
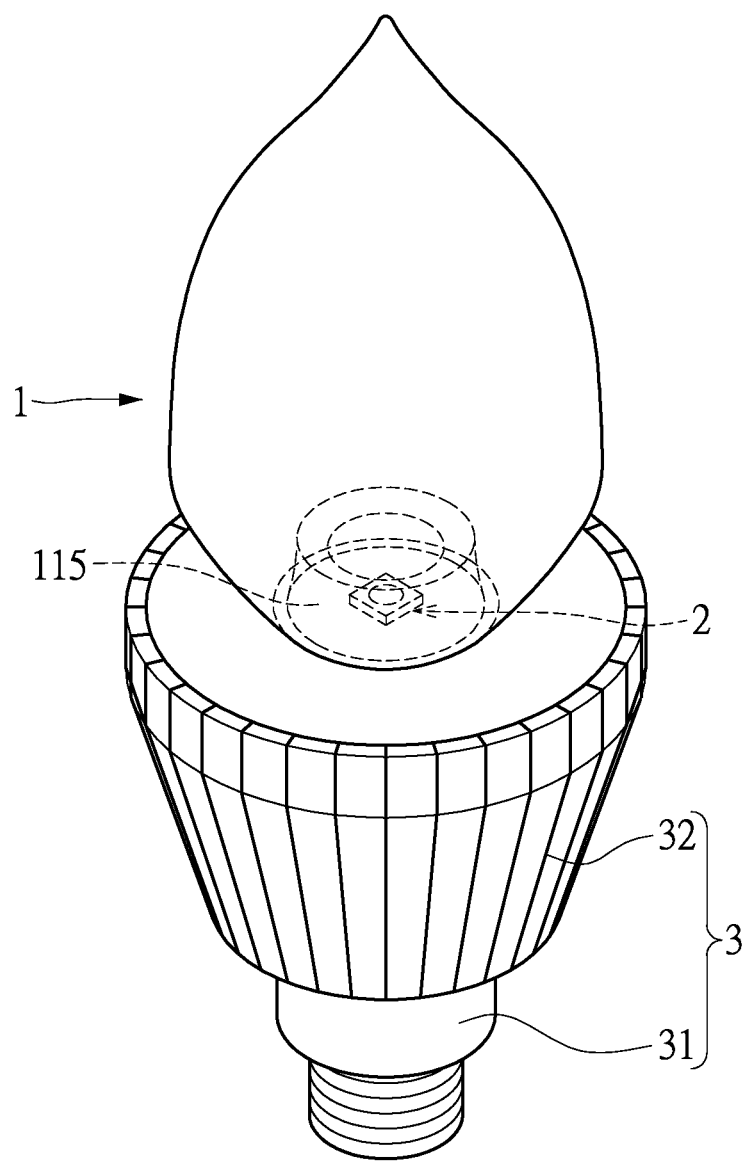
FIG. 12 is a perspective view of an illumination device having the light-guiding cover for a fourth embodiment of the instant disclosure.
Figure 13:
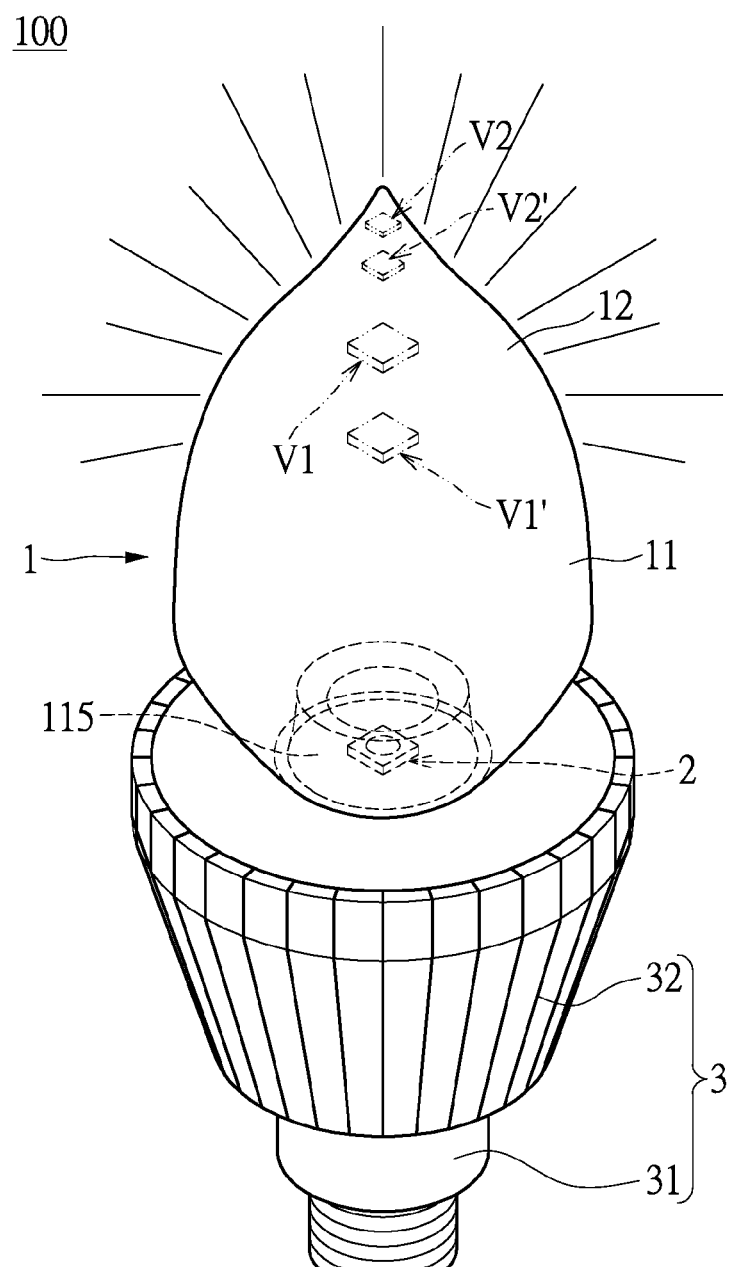
FIG. 13 is a perspective view of the illumination device having the light-guiding cover of the instant disclosure in practical use.

Please refer to FIGS. 12 and 13, which show an illumination device 100 having the above-described light-guiding cover 1. The illumination device 100 comprises a mounting seat 3, the LED 2 disposed on the mounting seat 3, and the light-guiding cover 1 disposed on the mounting seat 3 and spaced apart from the LED 2.

The mounting seat 3 has a lamp cap 31 and a heat sink 32, where the lamp cap 31 is arranged on one end of the heat sink 32. The LED 2 is arranged on the opposite end of the heat sink 32, and the heat generated by the LED 2 can be transferred to the heat sink 32 and then be dissipated. The LED 2 is electrically connected to the lamp cap 31.

The light-guiding cover 1, as discussed in this instant disclosure hereof, may be any of the light-guiding cover 1 from the previous embodiments. The light-guiding cover 1 is arranged on the heat sink 32, and the LED 2 is received by the accommodating slot 115 of the light-guiding cover 1.

When power is conducted through the lamp cap 31, the LED 2 will emit light. As shown in FIG. 13, light beams emanating from the LED 2 are being guided by the light-guiding cover 1. Virtual LEDs V1, V1', V2, V2' are produced centrally in the light-guiding cover 1, and the light-guiding cover 1 produces an omni-directional lighting effect. The lighting effect generated by the light-guiding cover 1 is similar to conventional tungsten lamps or candle bulbs.

Fifth Embodiment

Please refer to FIGS. 14 through 19, which show a fifth embodiment of the instant disclosure. Features similar to the first to fourth embodiments such as the material of the light-guiding cover 1 are not disclosed again, whereas the difference is as follow.

Figure 14:
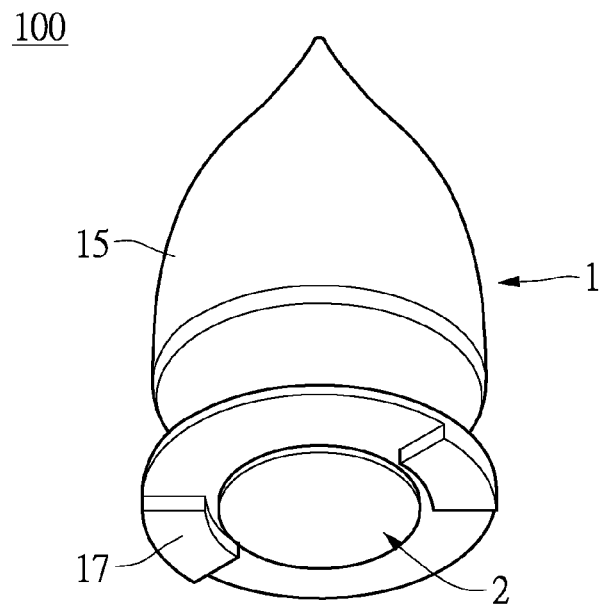
FIG. 14 is a perspective view of an illumination device in accordance with a fifth embodiment of the instant disclosure.
Figure 15:
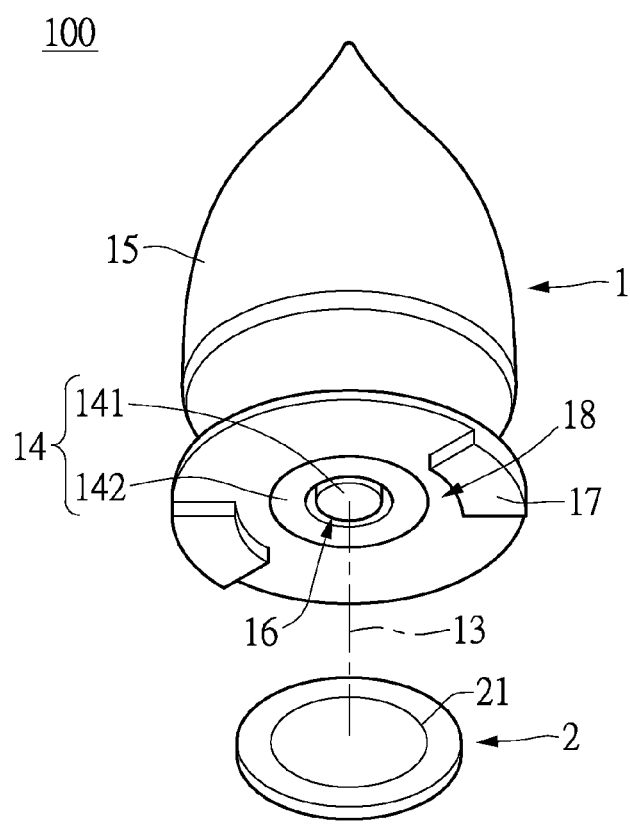
FIG. 15 is an exploded view of FIG. 14.
Figure 16:
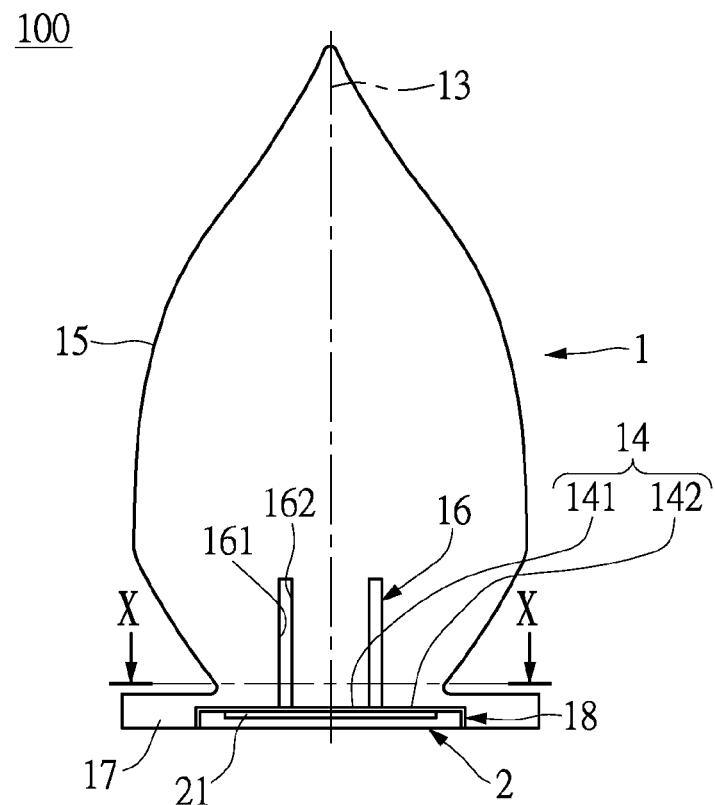
FIG. 16 is a cross-sectional view of FIG. 14.

Please refer to FIGS. 14 through 16, which show an illumination device 100 including a light-guiding cover 1 and an LED 2. The light-guiding cover 1 is integrally formed in one piece and includes a light input surface 14 with a central axis 13 and a light output surface 15. The light output surface 15 is a free-form surface. Moreover, the central axis 13 is perpendicular to the light input surface 14, and each one of the light input surface 14 and the light output surface 15 is symmetrical about the central axis 13.

Figure 18:
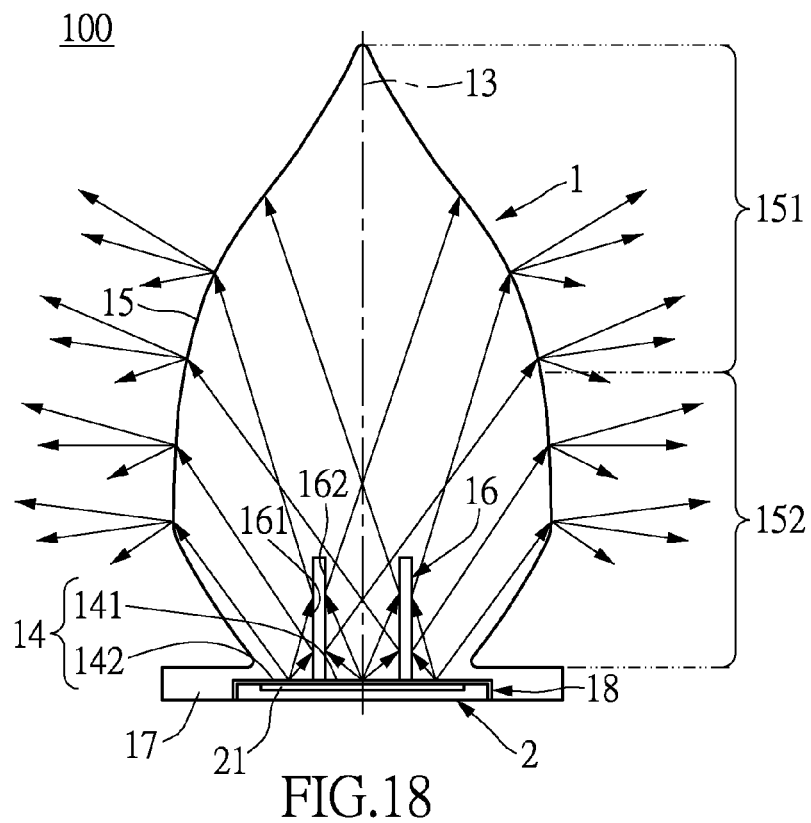
FIG. 18 shows the optical paths in the light-guiding cover of the instant disclosure.

The light input surface 14 is arranged on one end of the light-guiding cover 1 (i.e., the bottom end of the light-guiding cover 1 as shown in FIG. 15) and is a substantially flat surface. The light output surface 15 connected to the light input surface 14 substantially represents the overall appearance of the light-guiding cover 1. Specifically, the light-guiding cover 1 in the instant embodiment is shaped substantially like a candle flare. The light-guiding cover 1 in the instant embodiment is approximately defined as an upper half portion and a lower half portion. The overall profile shape of the upper half portion of the light-guiding cover 1 is tapered away from the light input surface 14, and a portion of the lower half region of the light-guiding cover 1 arranged away from the upper half region of the light-guiding cover 1 is defined as a neck portion. Furthermore, the light output surface 15 also has an upper light output region 151 and a lower light output region 152 (as shown in FIG. 18), which are respectively corresponding to the upper half portion and the lower half portion of the light light-guiding cover 1. That is to say, the distance between the upper light output region 151 of the light output surface 15 and the central axis 13 gradually decreases in the direction away from the light input surface 14. The configuration and curvature of the light output surface 15 can be changed according to the designer's required light distribution, but are not limited thereto. Moreover, the upper light output region 151 and the lower light output region 152 of the light output surface 15 are further disclosed as follow.

The light-guiding cover 1 is substantially symmetrical about the central axis 13. The light-guiding cover 1 has a reflecting portion 16 inwardly formed from the light input surface 14 and substantially symmetrical about the central axis 13. The reflecting portion 16 surrounding the central axis 13 has a first surface and a corresponding second surface. The first surface facing the light output surface 15 is arranged away from the central axis 13 and the second surface facing the central axis 13 is arranged near to the central axis 13. The light input surface 14 is defined into two regions, an inner region 141 and an outer region 142 by the reflecting portion 16. The inner region 141 is arranged at the inner side of the reflecting portion 16, the outer region 142 is arranged at the outer side of the reflecting portion 16. Specifically, the contour of the inner region 141 is defined by the second surface of the reflecting portion 16 orthogonally projecting to the light input surface 14, and the contour of the outer region 142 is defined by the contour of the light input surface 14 and the first surface of the reflecting portion 16 orthogonally projecting to the light input surface 14.

In the instant embodiment, the reflecting portion 16 is a slot concavely formed on the light input surface 14 surrounding the central axis 13 substantially along a direction parallel to the central axis 13. The reflecting portion 16 is filled with a medium having a refractive index lower than a refractive index of the light-guiding cover 1, whereby the first surface of the reflecting portion 16 facing the light output surface 15 is arranged away from the central axis 13, and the second surface of the reflecting portion 16 facing the central axis 13 is arranged near to the central axis 13. Moreover, the reflecting portion 16 is a circular slot, and the aspect ratio of the reflecting portion 16 is approximately 20:1. The medium is air. Each of the first surface and the second surface of the reflecting portion 16 have an average roughness (Ra) equal to or less than 80 nm and are smooth surfaces, so that the first surface of the reflecting portion 16 and the second surface of the reflecting portion 16 are providing totally internal reflection and respectively defined as an outer reflecting surface 161 and an inner reflecting surface 162.

Figure 19:
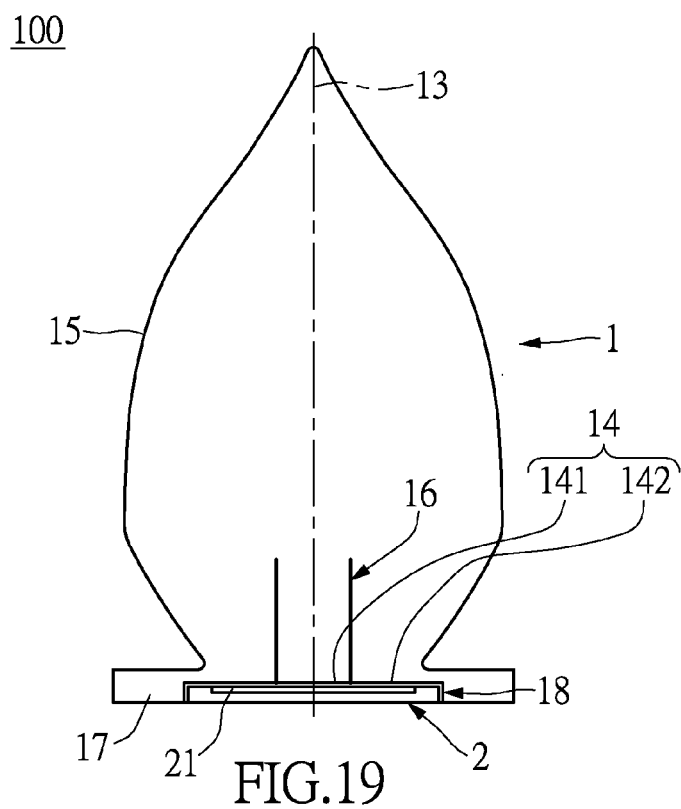
FIG. 19 is a schematic diagram of the illumination device illustrating another example in accordance with the fifth embodiment of the instant disclosure.

However, the design of the reflecting portion 16 of light-guiding cover 1 should not be limited to the particular example provided herein. For example, the aspect ratio of the reflecting portion 16 can be changed according to the designer's demands, and the medium can be replaced by another material having a refractive index lower than the refractive index of the light-guiding cover 1. Additionally, please refer to FIG. 19, which shows another example of the reflecting portion 16 of the instant disclosure. Specifically, the reflecting portion 16 is a tubular partition formed inside of the light-guiding cover 1 by a secondary processing method or the other possible method, thereby dividing the light input surface 14 into the inner region 141 and the outer region 142. Moreover, the function of the reflecting portion 16 of the instant embodiment is similar to a slot-like reflecting portion as shown in FIG. 16 and a partition as shown in FIG. 19 as an example, but the reflecting portion 16 can be any other reasonable replacements.

Figure 17:
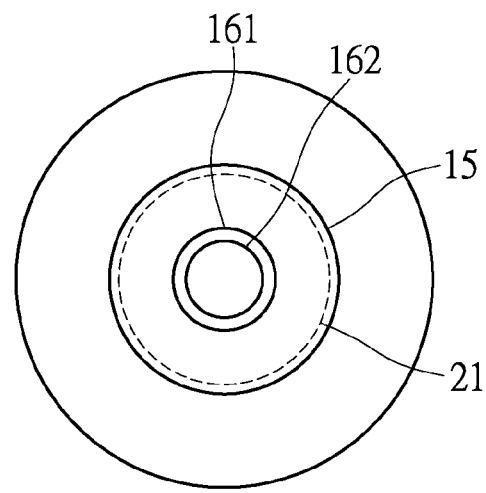
FIG. 17 is a cross-sectional view of FIG. 14 along line X-X in FIG. 16.

Please refer to FIG. 17, which shows a cross-section of the neck portion of the light-guiding cover 1 is illustrated by a cutting plane denoted as line X-X as shown in FIG. 16. The cross-section of the neck portion of the light-guiding cover 1 is perpendicular to the central axis 13 and substantially adjacent to the light input surface 14. At the cross-section of the neck portion of the light-guiding cover 1 perpendicular to the central axis 13, an area circumvented by the inner reflecting surface 162 can be approximately 40-60% of the smallest area circumvented between the light output surface 15 and the outer reflecting surface 161. That is, the area of the inner region 141 can be substantially 40-60% of the area of the outer region 142. Preferably, the area circumvented by the inner reflecting surface 162 is approximately 50% of a smallest area circumvented between the light output surface 15 and the outer reflecting surface 161. Specifically, the area of the inner region 141 is substantially 50% of the area of the outer region 142. However, the neck portion of the light-guiding cover 1 used in this embodiment is merely an example and is not meant to limit the instant disclosure. According to the above-mentioned design, the light-guiding cover 1 can provide omni-directional lighting by the reflecting portion 16 separating the light beams emanated from the LED 2 into two parts with predetermined ratio and enabling the two parts of the light beams to respectively enter the inner region 141 and the outer region 142.

Moreover, at the cross-section of the neck portion of the light-guiding cover 1 perpendicular to the central axis 13 (as shown in FIG. 17), each cross-sectional contour of the inner reflecting surface 162 and the outer reflecting surface 161 is circle, and a diameter difference between the diameter of the cross-sectional contour of the outer reflecting surface 161 and the diameter of the cross-sectional contour of the inner reflecting surface 162 is preferably smaller. Specifically, when the diameter difference reduces, fewer light beams (i.e., the light beams emanated from the light emitting surface 21 of the LED 2) enter the slot-like reflecting portion 16 (as shown in FIG. 16). Notably, the slot-like reflecting portion 16 as shown in FIG. 16 has a high aspect ratio, so that the area occupied by the reflecting portion 16 is minimal at a plane where the light input surface 14 is arranged at. Thus, the light beams emanated from the light emitting surface 21 of the LED 2 and enter the slot-like reflecting portion 16 are so small (almost non-existent) that it can be ignored. Additionally, when the reflecting portion 16 is the tubular partition as shown in FIG. 19, the diameter difference is almost non-existent (i.e., the diameter difference is substantially zero), so that the light beams do not enter the reflecting portion 16 as shown in FIG. 19, thereby without affecting the distribution ratio of the light beams emitted through the inner region 141 and the outer region 142.

Moreover, the light output surface 15 is a non-smooth surface and has an average roughness (Ra) equal to or larger than 10 μm. Specifically, the light output surface 15 can be composed of a plurality of micro light-guiding structures, and each micro light-guiding structure may be one of a convex body and a concave body or may be hazed by any surface treatment technique (such as surface etching, surface fogging, etc.) to further diffuse the light uniformly, such that the light output surface 15 of the light-guiding cover 1 may illuminate in a manner to better engender soothing and visually pleasing lighting effects.

Please refer to FIGS. 14 through 16, the light-guiding cover 1 further includes an holding portion 17 integrally and outwardly extended from a portion between the light input surface 14 and the light output surface 15. An accommodating slot 18 is defined by the holding portion 17 and the light input surface 14 for receiving the LED 2. Preferably, the accommodating slot 18 is sized to be substantially the same as the LED 2. In another embodiment (not shown), the light-guiding cover 1 can be provided without the holding portion 17. For example, the heat sink 32 of the mounting seat 3 in the fourth embodiment can be provided with an accommodating slot (not shown) for receiving and holding the LED 2.

The LED 2 has a light emitting surface 21 arranged on a top surface thereof. The LED 2 is arranged adjacent to the light input surface 14 of the light-guiding cover 1, and the light emitting surface 21 orientates toward the light input surface 14. Preferably, a central point of the light emitting surface 21 of the LED 2 is aligned with the central axis 13. Specifically, the light input surface 14 of the light-guiding cover 1 is substantially in contact with or arranged adjacent to (e.g., the light input surface 14 is physically touching the light emitting surface 21 of the LED 2 or having a clearance between) the light emitting surface 21 of the LED 2.

In FIG. 17, the cross-section of the neck portion of the light-guiding cover 1 is illustrated by a cutting plane denoted as line X-X as shown in FIG. 16. When the light emitting surface 21 of the LED 2 is orthogonally projecting toward the cross-section of the neck portion of the light guiding cover 1 perpendicular to the central axis 13, a contour of the light emitting surface 21 is arranged between the cross-sectional contour of the light output surface 15 and the cross-sectional contour of the outer reflecting surface 161 at the cross-section of the neck portion of the light-guiding cover 1 perpendicular to the central axis 13. Specifically, the light emitting surface 21 is sized to be substantially the same as the light input surface 14.

Thus, as shown in FIG. 18, a portion of the light beams emanated from the center portion of the light emitting surface 21 enters the light-guiding cover 1 via the inner region 141 of the light input surface 14 and is completely reflected by the inner reflecting surface 162 to exit from the upper light output region 151 of the light output surface 15. The other portion of the light beams emanated from the outer portion of the light emitting surface 21 surrounding the center portion thereof enters the light-guiding cover 1 via the outer region 142 of the light input surface 14 and is completely reflected by the outer reflecting surface 161 to exit from the upper light output region 151 as well as the lower light output region 152 of the light output surface 15.

Specifically, a length of the upper light output region 151 of the light output surface 15 with respect to the central axis 13, such as the height of the upper light output region 151, is approximately 50% of a length of the light output surface 15 with respect to the central axis 13 (i.e., the height of the upper light output region 151 is half of the height of the light output surface 15). That is to say, a length of the lower light output region 152 of the light output surface 15 with respect to the central axis 13, such as the height of the lower light output region 152, is approximately 50% of the length of the light output surface 15 with respect to the central axis 13 (i.e., the height of the lower light output region 152 is half of the height of the light output surface 15). However, the design of the height of the upper light output region 151/ lower light output region 152 should not be limited to the particular example provided herein. In other embodiment, the length of the upper light output region 151 of the light output surface 15 with respect to the central axis 13 can be approximately 40-60% of the length of the light output surface 15 with respect to the central axis 13.

Accordingly, the relative proportions of the inner region 141 and the outer region 142 of the light input surface 14 are designed to enable the light beams emanated from the LED 2 to emit into a center portion of the light-guiding cover 1 enclosed by the inner reflecting surface 162 of the reflecting portion 16 and the other portion of the light-guiding cover 1 surrounding the center portion thereof. The light beams are separated into two parts by the reflecting portion 16 and then completely reflected by the inner reflecting surface 162 and the outer reflecting surface 161 respectively to uniformly exit from the upper light output region 151 and the lower light output region 152 of the light output surface 15, thereby providing omni-directional lighting.

Besides, the illumination device 100 of the instant embodiment can further include the mounting seat 3 disclosed by the fourth embodiment for fixing the light-guiding cover 1 and the LED 2 on the mounting seat 3 (not shown).

Based on the instant embodiment, the reflecting portion 16 is adapted to divide the light input surface 14 into the inner reflecting surface 162 and the outer reflecting surface 161, such that the light beams emanated from the LED 2 are separated into two parts by the reflecting portion 16 for enabling the two parts of the light beams to be respectively reflected by the inner reflecting surface 162 and the outer reflecting surface 161, thereby guiding the two parts of the light beams to respectively pass through two predetermined areas of the light output surface 15. For example, the light beams emanated from the LED 2 are completely reflected by the inner reflecting surface 162 and the outer reflecting surface 161, as well as adjustably and uniformly distributed to the upper and lower light output regions 151, 152 of the light output surface 15, thereby providing omni-directional lighting for the illumination device 100. Specifically, when the illumination device 100 having the light-guiding cover 1 as described above is in use, the light-guiding cover 1 can omni-directionally illuminate.

Moreover, the light-guiding cover 1 is shaped like a candle flare. Thus, the illumination device 100 having the light-guiding cover 1 can provide similar lighting effect as a conventional candle and is aesthetically pleasing without the need to further furbish with additional ornamentations. Thereby, manufacturing cost and assembling time of the illumination device 100 can be saved.

The descriptions illustrated supra set forth simply the preferred embodiments of the present invention; however, the characteristics of the instant disclosure are by no means restricted thereto. All changes, alternations, or modifications conveniently considered by those skilled in the art are deemed to be encompassed within the scope of the present invention delineated by the following claims.

What is claimed is:

1. An illumination device, comprising:
   a light-guiding cover integrally formed in one piece, wherein the light-guiding cover includes a light input surface and a light output surface, the light input surface defines a central axis perpendicular thereto, and each one of the light input surface and the light output surface is symmetrical about the central axis,
   wherein the light-guiding cover has a reflecting portion inwardly formed from the light input surface and substantially symmetrical about the central axis, the reflecting portion surrounding the central axis has a first surface and a corresponding second surface, and wherein the light input surface is defined as an inner region and an outer region by the reflecting portion, the first surface of the reflecting portion facing the light output surface is arranged away from the central axis to act as an outer reflecting surface, the second surface of the reflecting portion facing the central axis is arranged near to the central axis to act as an inner reflecting surface; and
   an LED having a light emitting surface arranged in a top surface thereof, wherein the LED is arranged adjacent to the light input surface of the light-guiding cover, and the light emitting surface orientates toward the light input surface;
   wherein the light emitting surface of the LED is sized to be substantially the same as the light input surface of the light-guiding cover;
   wherein the LED is configured to emanate portions of light beams into the light-guiding cover via the inner region of the light input surface and reflected by the inner reflecting surface to exit from an upper light output region of the light output surface, another portions of light beams emanate into the light-guiding cover via the outer region of the light input surface and reflected by the outer reflecting surface to exit from the upper light output region and a lower light output region of the light output surface.

2. The illumination device of claim 1, wherein the inner reflecting surface and the outer reflecting surface are smooth surfaces.

3. The illumination device of claim 2, wherein the light input surface is a flat surface, the light output surface is a free-form surface, the reflecting portion is a slot concavely formed on the light input surface surrounding the central axis substantially along a direction parallel to the central axis, the reflecting portion is filled with a medium having a refractive index lower than a refractive index of the light-guiding cover.

4. The illumination device of claim 2, wherein the light input surface is a flat surface, the light output surface is a free-form surface, the reflecting portion is a partition arranged in the light-guiding cover and embedded from the light input surface surrounding the central axis substantially along a direction parallel to the central axis.

5. The illumination device of claim 3, wherein the light output surface has an average roughness (Ra) equal to or larger than 10 µm, each of the inner reflecting surface and the outer reflecting surface has an average roughness equal to or less than 80 nm.

6. The illumination device of claim 4, wherein the light output surface has an average roughness equal to or larger than 10 µm, each of the inner reflecting surface and the outer reflecting surface has an average roughness equal to or less than 80 nm.

7. The illumination device of claim 3, wherein at the cross-section of the light-guiding cover perpendicular to the central axis, an area circumvented by the inner reflecting surface is approximately 40-60% of a smallest area circumvented between the light output surface and the outer reflecting surface.

8. The illumination device of claim 4, wherein at the cross-section of the light-guiding cover perpendicular to the central axis, an area circumvented by the inner reflecting surface is approximately 40-60% of a smallest area circumvented between the light output surface and the outer reflecting surface.

9. The illumination device of claim 7, wherein the upper light output region of the light output surface has a length aligned with the central axis, and the length of the upper light output region is approximately 40-60% of an overall length of the light output surface aligned with the central axis.

10. The illumination device of claim 8, wherein the upper light output region of the light output surface has a length aligned with the central axis, and the length of the upper light output region is approximately 40-60% of an overall length of the light output surface aligned with the central axis.

11. The illumination device of claim 2, wherein the light-guiding cover includes a holding portion defining an accommodating slot, the LED is received in the accommodating slot, the light input surface of the light-guiding cover abuts substantially against the light emitting surface of the LED, and a center point of the light emitting surface is arranged at the central axis.

12. The illumination device of claim 2 further comprising a mounting seat having a lamp cap and a heat sink, wherein the lamp cap is disposed on one end of the heat sink, and the LED is disposed on another end of the heat sink and is electrically connected to the lamp cap.

13. A light-guiding cover, comprising: a light input surface and a light output surface, the light input surface defining a central axis perpendicular thereto, and each one of the light input surface and the light output surface is symmetrical about the central axis, the light-guiding cover having a reflecting portion inwardly formed from the light input surface and substantially symmetrical about the central axis, wherein the reflecting portion surrounding the central axis has a first surface and a corresponding second surface, and wherein the light input surface is defined as an inner region and an outer region by the reflecting portion, the first surface of the reflecting portion facing the light output surface is arranged away from the central axis to act as an outer reflecting surface, the second surface of the reflecting portion facing the central axis is arranged near to the central axis to act as an inner reflecting surface.

14. The light-guiding cover of claim 13, wherein the inner reflecting surface and the outer reflecting surface are respectively two smooth surfaces.

15. The light-guiding cover of claim 14, wherein the light input surface is a flat surface, the light output surface is a free-form surface, the reflecting portion is a slot concavely formed on the light input surface surrounding the central axis substantially along a direction parallel to the central axis, the reflecting portion is filled with a medium having a refractive index lower than a refractive index of the light-guiding cover.

16. The light-guiding cover of claim 14, wherein the light input surface is a flat surface, the light output surface is a free-form surface, the reflecting portion is a partition arranged in the light-guiding cover and embedded from the light input surface surrounding the central axis substantially along a direction parallel to the central axis.

17. The light-guiding cover of claim 15, wherein the light output surface has an average roughness equal to or larger than 10 μm, each of the inner reflecting surface and the outer reflecting surface has an average roughness equal to or less than 80 nm.

18. The light-guiding cover of claim 16, wherein the light output surface has an average roughness equal to or larger than 10 μm, each of the inner reflecting surface and the outer reflecting surface has an average roughness equal to or less than 80 nm.

19. The light-guiding cover of claim 17, wherein at the cross-section of the light-guiding cover perpendicular to the central axis, an area circumvented by the inner reflecting surface is approximately 40-60% of a smallest area circumvented between the light output surface and the outer reflecting surface.

20. The light-guiding cover of claim 18, wherein at the cross-section of the light-guiding cover perpendicular to the central axis, an area circumvented by the inner reflecting surface is approximately 40-60% of a smallest area circumvented between the light output surface and the outer reflecting surface.

21. The light-guiding cover of claim 14, wherein the light-guiding cover includes a holding portion defining an accommodating slot for receiving an LED.

* * * * *